United States Patent [19]

Lighthizer

[11] Patent Number: 4,722,512
[45] Date of Patent: Feb. 2, 1988

[54] HAND OPERATED DIGGING TOOL COMPRISING A GROUND PENETRATING PORTION

[76] Inventor: Harold Lighthizer, 7915 East Pike, Norwich, Ohio 43767

[21] Appl. No.: 36,420

[22] Filed: Apr. 6, 1987

[51] Int. Cl.⁴ .............................................. A01B 1/02
[52] U.S. Cl. ..................................... 254/131.5; 294/59
[58] Field of Search ...................... 294/59, 60, 58, 50, 294/49, 65.5; 254/131.5, 131, 132

[56] References Cited

U.S. PATENT DOCUMENTS

| | | | |
|---|---|---|---|
| 2,419,015 | 4/1947 | Gascoigne et al. | 254/131.5 |
| 2,716,538 | 8/1955 | Arrowood | 254/131.5 |
| 4,086,699 | 5/1978 | Olkkola | 294/49 |
| 4,456,292 | 6/1984 | Haeusler et al. | 294/65.5 |
| 4,461,458 | 7/1984 | Poulin | 294/59 |

Primary Examiner—James B. Marbert
Attorney, Agent, or Firm—John L. Gray

[57] ABSTRACT

A hand operated digging tool comprising a ground penetrating portion, such as a shovel, has a lever arm hingedly attached to the back of the shovel adjacent to where the shovel engages its handle. The lever arm is provided with an extension at right angles to it adjacent to the hinged portion so as to space the lever arm from the shovel when both the lever arm and the shovel are positioned on the ground in digging position and which will push the lever arm back into engagement with a holder on the back of the handle as the operator completes the shoveling step removing the shovel from the ground.

6 Claims, 10 Drawing Figures

HAND OPERATED DIGGING TOOL COMPRISING A GROUND PENETRATING PORTION

BACKGROUND OF THE INVENTION

Lever assisted shovels and other types of hand digging tools are old in the art, as evidenced by the following patents: U.S. Pat. No. 738,057, O'Connor; U.S. Pat. No. 1,353,459, Dann; U.S. Pat. No. 2,269,119, Mason; U.S. Pat. No. 2,419,015, Gascoigne, et al.; U.S. Pat. No. 3,035,816, Conant; and U.S. Pat. No. 4,461,458, Poulin. However, in all of these prior art disclosures, when the digging devices are in use after they are lifted from the ground, the lever arm is free to swing loosely and thus be in the way of operator.

In the case of U.S. Pat. No. 4,461,458, Poulin, the lever arm 28 may be stored in clip 40 on the handle when not in use, and likewise in U.S. Pat. No. 2,269,119, Mason, the spring 31 will hold the arm forwardly at the back of the shovel blade for the operative position or hold the arm raised up in back against the shovel handle as when it is desired to use the shovel in a conventional manner (page 2, column 1, lines 65–72).

In all of these uses of the digging tools of the prior art, the lever arm is either in the down operative position or may be manually raised into the upper stored position but while in the operative position when the shovel is lifted from the ground, the lever will hang below the shovel and thus be in the way.

SUMMARY OF THE INVENTION

Applicant's invention is directed to a hand operated digging tool using a lever to provide assistance in the digging steps which will function as a lever while the ground penetrating portion of the digging tool is in the earth but will automatically be returned to the carrying position along the digging tool handle as the ground penetrating portion of the digging tool is removed from the earth and then once the digging tool is again deployed with the tip of the ground penetrating portion of the tool on the surface of the ground, the mere action of so positioning the ground penetrating portion of the digging tool will result in the lever arm being returned to an operative position and also being returned to an optimum angle with respect to the ground penetrating portion of the digging tool. The ground penetrating portion of the digging tool may be a conventional shovel, a device to be used to pry loose rocks, or a trenching tool for assistance in laying underground cable.

It is therefore an object of this invention to provide a hand operated, digging tool which utilizes a lever to assist in penetration of the ground penetrating portion of the digging tool into the ground.

It is a further object of this invention to use such a digging tool whereby the optimum angular relationship between the lever arm and the ground penetrating portion of the digging tool is automatically determined at the start of the digging stroke.

It is still a further object of this invention to provide a digging tool whereby the lever arm is automatically raised to a carrying position along the handle of the digging implement as the last natural movement of the operator in removing the ground penetrating portion of the digging tool from the ground.

These, together with other objects and advantages of the invention will become more readily apparent to those skilled in the art when the following general statements and descriptions are read in the light of the appended drawings.

DETAILED DESCRIPTION OF THE INVENTION

Figure 4:
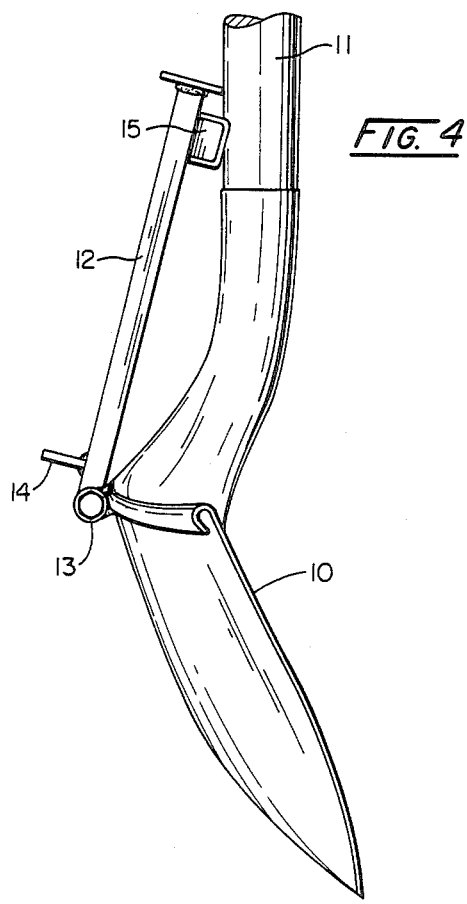
FIGS. 4 and 5 are side and front elevation views of applicant's invention as applied to a shovel.
Figure 5:
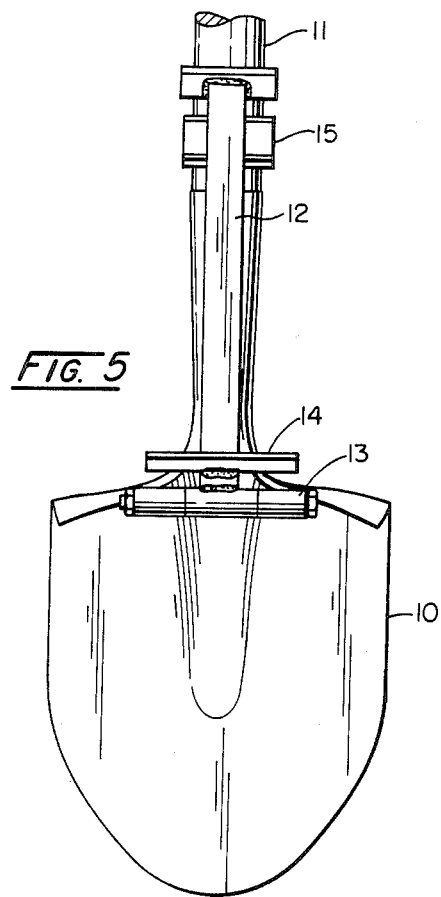

Referring more particularly to FIGS. 4 and 5, there is shown a conventional shovel 10 provided with a handle 11 with a lever arm 12 hingedly connected at 13 to the back of the shovel 10. The lever arm 12 is provided with an extension 14 at approximately right angles thereto just above the hinged connection 13. As shown in FIG. 4, a magnet 15 is attached to the handle 11 which engages the lever arm 12. Other than a magnet, a suitable clip or other detachable fastening device may be used.

Figure 1:
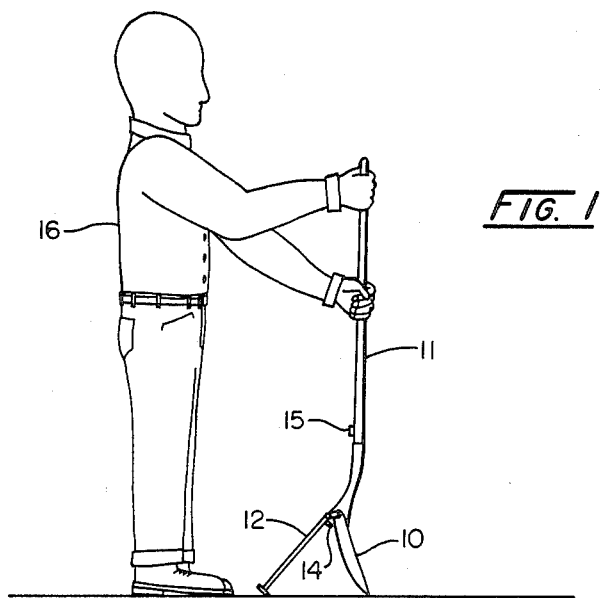
FIGS. 1, 2, and 3 show the invention of applicant in use in the form of a shovel in the three positions normally employed in a hand digging step.
Figure 2:
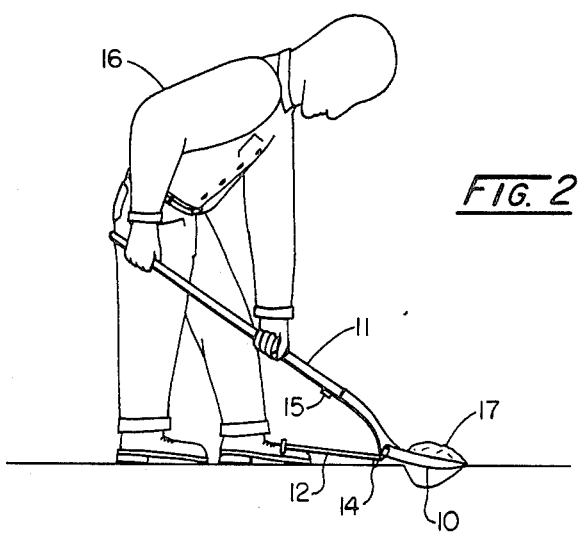
Figure 3:
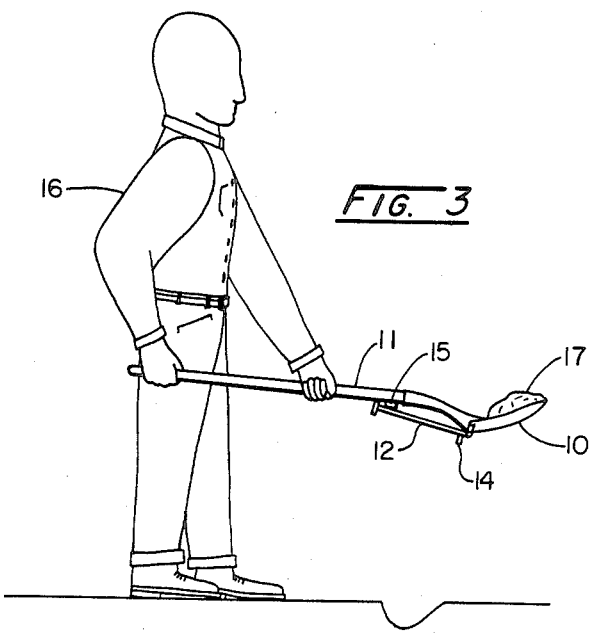

The digging tool in its embodiment as a shovel is shown sequentially in FIGS. 1-3.

Referring to FIG. 1, the operator 16 places the shovel handle 11 in a vertical position. The lever arm 12 assumes a desired approximately 45° angle with the back of the shovel 10 because of the positioning of the etension 14. In operation, the operator 16 will place one of his feet at the base of the lever 12 and proceed to pull downwardly on the shovel handle 11 thus forcing the shovel 10 into the ground. As this normal motion continues and the operator 16 proceeds to push forward with the shovel 10 to lift the shovel 10 from the ground with a load of dirt 17, as shown in FIG. 2, the extension 14 will engage the ground as the shovel moves forwardly in the natual motion of the operator in completing the digging cycle, and because of the relative length of the lever arm 12 and the length of extension 14 the lever arm 12 will be forced upwardly where it will engage and be held by the magnet 15.

Referring now to FIG. 3, it will be seen that as the operator 16 straightens up to lift the load of dirt 17 in the shovel 10 to place it in a wheelbarrow or some other appropriate location, the lever arm 12 is held against the shovel handle 11 by means of the magnet 15 or comparable detachable fastening device, with the extension 14 also out of the way. After the dirt 17 has been thrown from the shovel 10, when the shovel 10 again is placed against the ground with a hard motion to cause the tip of the shovel to slightly penetrate the surface of the earth, as shown in FIG. 1, the lever arm 12 will disengage from the magnet 15 and assume the correct angular position with the shovel 10 so that the procedure may be repeated.

While this invention has been described in its operational context as applied to a shovel as the ground penetrating portion of the tool, it may be used with a variety of ground penetrating elements.

Figure 6:
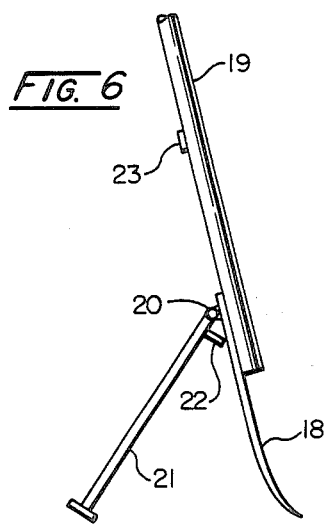
FIGS. 6 and 7 are side and front elevation views of applicant's invention as applied to a digging tool that is specially designed to remove rocks and boulders from the subsurface of the ground.
Figure 7:
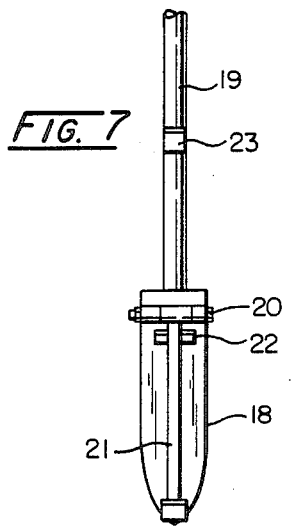

Referring now to FIGS. 6 and 7, a rock removal tool having a curved, pointed blade 18 is attached to a handle 19 and the upper portion of the curved, pointed blade 18 is hingedly connected at 20 to a lever arm 21 which is provided adjacent to the hinged connection 20 with an extension 22. A magnet or similar detachable holding device 23 is attached to the handle 19. In use, this device functions exactly the same as does the shovel described above except that instead of ending up with a load of dirt 17 at the end of the digging cycle, a large stone or stones may have been pried loose where they can be removed from the ground by hand or by a shovel or other tool. The extension 22 functions in exactly the same way to optimally angularly position the curved, pointed blade 18 with respect to the lever arm 21 at the start of the cycle and will also kick the lever arm 21 up into engagement with the magnet 23 at the end of the cycle as the tool is removed from the ground.

Figure 8:
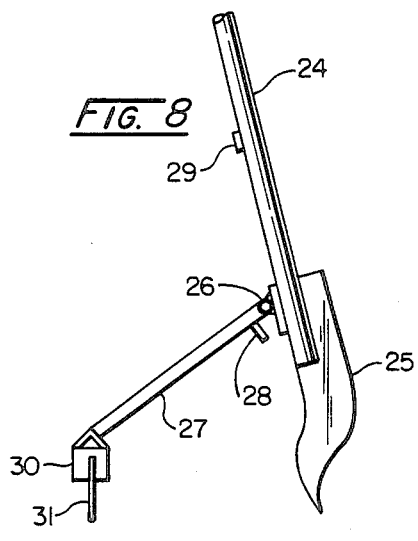
FIGS. 8 and 9 are side and front elevation views of a variation of applicant's invention which may be used to dig a trench in which to lay cable.
Figure 9:
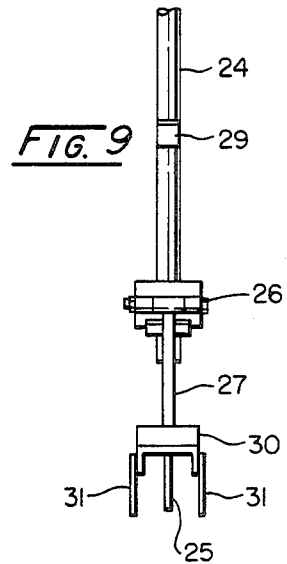

FIGS. 8 and 9 show a variation of this hand operated digging tool which is especially used for trenching operations in laying underground cable. In this case the handle 24 is attached to a blade 25 which when moved through the earth will move in the same direction as the excavation rather than at right angles to it as is shown in FIGS. 4–7. This blade 25 is hingedly connected at 26 to a lever arm 27 provided with an extension 28 and the handle 24 is provided with a magnet 29. The opposite end of the lever arm 27 from where the lever arm hingedly engages the back of the blade 25 at hinge connection 26 may be provided with an element 30 from which depends vertically extending teeth 31—31 so as to provide greater stability in operation. Otherwise, the device functions in exactly the same fashion as does the previously described two devices.

Figure 10:
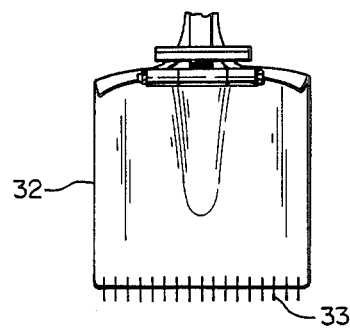
FIG. 10 shows a variation of applicant's invention as applied to a multi-toothed shovel.

FIG. 10 discloses a shovel variation having a square shovel 32 provided with a plurality of teeth 33 thereon, useful in certain soil and stone conditions. The function of this device, as far as the handle and the lever arm, is the same as shown in FIGS. 4 and 5.

Thus there is disclosed a digging tool provided with a lever assist which will put the lever into play when the device is firmly positioned on the surface of the ground at the most desirable angle for use of the ground penetrating portion of the tool and which will automatically return the lever to a temporary locked position on the handle of the tool in the normal digging motion of the operator as the operator brings the digging tool out of the ground.

While this invention has been described in its preferred embodiment, it is to be appreciated that variations therefrom may be made without departing from the true scope and spirit of the invention.

What is claimed is:

1. A hand operated digging tool comprising a ground penetrating portion, a handle to which said ground penetrating portion is attached, a first lever arm hingedly attached to said ground penetrating portion adjacent to the attachment of said ground penetrating portion to said handle, a second shorter lever arm extending inwardly from said first lever arm adjacent to said hinged attachment of said first lever arm to said ground penetrating portion and being of a length to cause said first lever arm to be angularly displaced from said ground penetrating portion, and holding means on said handle for holding said first lever arm in substantially parallel relationship with said handle, when engaged.

2. The digging device of claim 1 wherein said ground penetrating portion is a shovel.

3. The digging device of claim 1 wherein said ground penetrating portion of said device is a curved, vertically extending prying tool.

4. The digging device of claim 1 wherein said ground penetrating portion is a vertically extending cutting tool extending in the direction of motion of the tool in use whereby the tool may be used to cut a narrow trench for laying cable or the like.

5. The digging device of claim 1 wherein said ground penetrating portion is in the form of a toothed shovel.

6. The digging device of claim 1 wherein said disengagable means on said handle is a magnet.

* * * * *